United States Patent
Fowler et al.

(10) Patent No.: US 8,102,391 B2
(45) Date of Patent: Jan. 24, 2012

(54) HYBRID RENDERING OF IMAGE DATA UTILIZING STREAMING GEOMETRY FRONTEND INTERCONNECTED TO PHYSICAL RENDERING BACKEND THROUGH DYNAMIC ACCELERATED DATA STRUCTURE GENERATOR

(75) Inventors: Dave Fowler, Palo Alto, CA (US); Eric Oliver Mejdrich, Rochester, MN (US); Paul Emery Schardt, Rochester, MN (US); Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 12/101,349

(22) Filed: Apr. 11, 2008

(65) Prior Publication Data

US 2009/0256836 A1 Oct. 15, 2009

(51) Int. Cl.
*G06T 15/00* (2011.01)
(52) U.S. Cl. ........ 345/419; 345/426; 345/427; 345/611; 358/444
(58) Field of Classification Search .................. 345/419, 345/426, 427, 611; 358/444
See application file for complete search history.

(56) References Cited

U.S. PATENT DOCUMENTS

| | | | |
|---|---|---|---|
| 6,961,058 B2 * | 11/2005 | Guo et al. | 345/426 |
| 7,167,177 B2 * | 1/2007 | Guo et al. | 345/426 |
| 7,567,248 B1 * | 7/2009 | Mark et al. | 345/426 |

* cited by examiner

*Primary Examiner* — Phu Nguyen
(74) *Attorney, Agent, or Firm* — Wood, Herron & Evans LLP

(57) ABSTRACT

A circuit arrangement and method provide a hybrid rendering architecture capable of interfacing a streaming geometry frontend with a physical rendering backend using a dynamic accelerated data structure (ADS) generator. The dynamic ADS generator effectively parallelizes the generation of the ADS, such that an ADS may be built using a plurality of parallel threads of execution. By doing so, both the frontend and backend rendering processes are amendable to parallelization, and enabling if so desired real time rendering using physical rendering techniques such as ray tracing and photon mapping. Furthermore, streaming geometry frontends such as OpenGL and DirectX compatible frontends can readily be adapted for use with physical rendering backends, thereby enabling developers to continue to develop with raster-based API's, yet still obtain the benefits of physical rendering techniques.

25 Claims, 10 Drawing Sheets

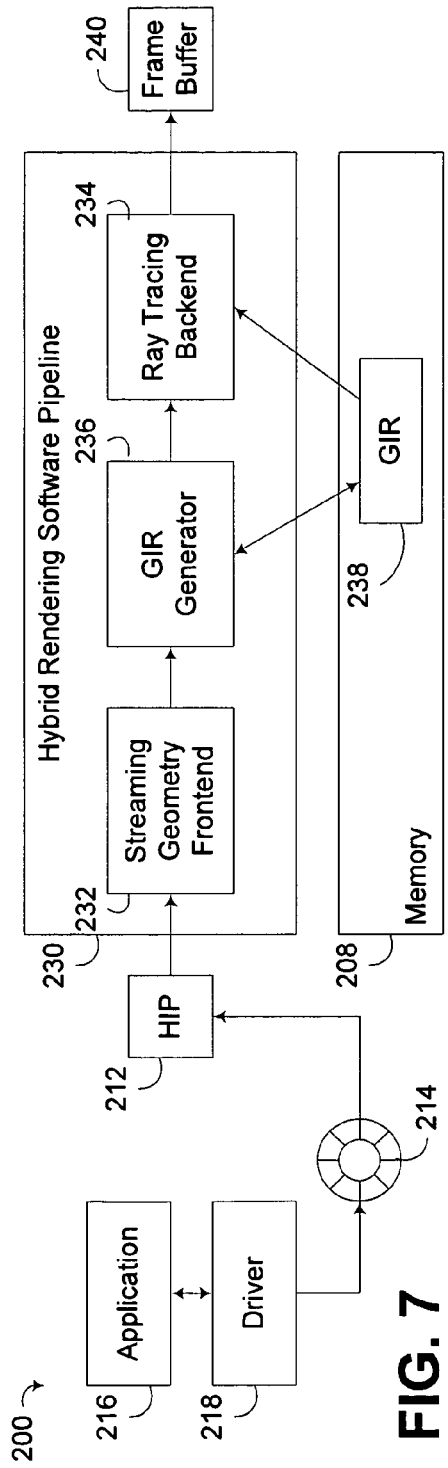
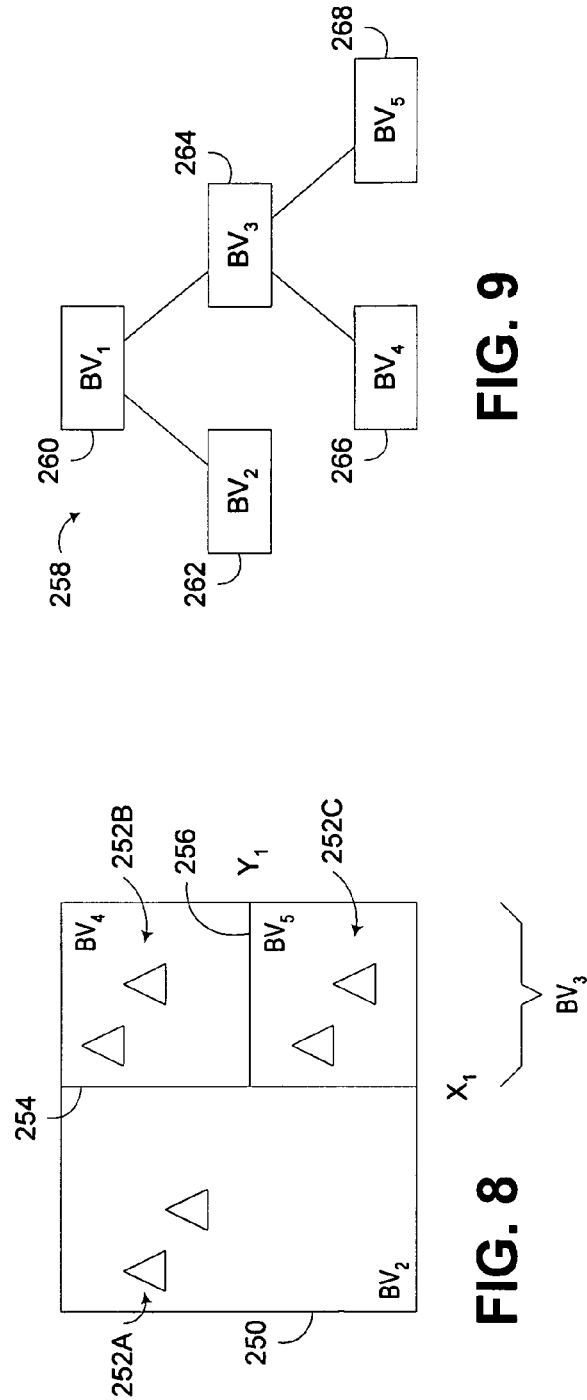
FIG. 7
FIG. 8
FIG. 9

HYBRID RENDERING OF IMAGE DATA UTILIZING STREAMING GEOMETRY FRONTEND INTERCONNECTED TO PHYSICAL RENDERING BACKEND THROUGH DYNAMIC ACCELERATED DATA STRUCTURE GENERATOR

FIELD OF THE INVENTION

The invention is generally related to data processing, and in particular to graphical imaging processing and rendering.

BACKGROUND OF THE INVENTION

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from several drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Several alternative techniques rendering a real world three-dimensional scene onto a two-dimensional monitor using pixels have been developed based upon more realistic physical modeling. One such physical rendering technique is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three-dimensional scenes with more realism than rasterization. This is partially due to the fact that ray tracing simulates how light travels and behaves in a real world environment, rather than simply projecting a three-dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing, however, is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

With continued improvements in semiconductor technology in terms of clock speed and increased use of parallelism; however, real time rendering of scenes using physical rendering techniques such as ray tracing becomes a more practical alternative to rasterization. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Hardware-based pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

Despite these advances, however, the adoption of physical rendering techniques faces a number of challenges. One such challenge relates to the manner in which physical rendering techniques are capable of harnessing parallelization to improve performance.

In general, rendering processes often can be logically broken into frontend and backend processes. The frontend process is used to basically build primitives for a scene to be depicted in the displayed image. A primitive is the basic geometry element used to represent an object in a scene, and in many conventional techniques, primitives are defined as triangles. Objects to be placed in a scene may be predefined and loaded during the frontend process, or objects can be built on-the-fly based upon mathematical algorithms that define the shape of a 3D object.

The frontend process typically places objects in a scene, determines and/or creates the primitives for those objects, and assigns colors or textures to each of the primitives. Once objects and primitives are placed, no movement of those objects or primitives is typically permitted.

The backend process takes the primitives and the colors or textures assigned to those primitives by the frontend process, and draws the 2D image, determining which primitives are visible from the desired viewpoint, and based upon the displayed primitives, assigning appropriate colors to all of the pixels in the image. The output of the backend process is fed to an image buffer for display on a video display.

For a physical rendering backend, the output of the frontend process, the list of primitives and their assigned colors or textures, often must be transformed into a data structure that can be used by the physical rendering backend. In many physical rendering techniques, such as ray tracing and photon mapping, this data structure is referred to as an Accelerated Data Structure (ADS).

Given the relatively high processing requirements for physical rendering techniques, the ADS enables fast and efficient retrieval of primitives to assist in optimizing the performance of such techniques. However, while it has been found that many of the processes involved in using an ADS to perform physical rendering are capable of being accelerated via parallelization, the generation of the ADS itself has conventionally not been well suited for parallelization. In addition, many frontend processes are also well suited for parallelization. Some raster-based frontends, for example, are implemented as streaming frontends that progressively stream primitives to a raster-based backend, rather than outputting the primitives in a batch once the frontend process is completed. Consequently, while many of the frontend and backend processes associated with rendering are capable of taking advantage of parallelization to improve performance, conventional ADS generation techniques, which are not as readily suited for parallelization, may become performance bottlenecks that hamper the overall performance of a physical rendering process.

Therefore, there exists a need for more efficient techniques to perform ray tracing and other forms of physical rendering.

Another important challenge for physical rendering is the comparative lack of software support. In particular, software developers have invested a tremendous amount of effort and training in rasterization based rendering. The most commonly used Application Programming Interfaces (API's), the libraries of routines that are called by application programs to control the rendering process, such as OpenGL™ and DirectX™, are all raster-based, and presume the use of a rasterization based rendering technique.

An end-to-end physical rendering technique, on the other hand, would typically require a different API, and consequently, software developers would be required to learn and use a different API in order to support physical rendering techniques in their software applications. Beyond the added learning curve, however, additional problems are presented because new software applications are often based in large part on prior code, and furthermore, many applications are written for use on multiple hardware platforms, e.g., multiple game consoles, or are adapted from versions originally written for use on a different hardware platform. The benefit of an API is that the specifics of the underlying hardware platform are effectively hidden from the application, such that different implementations of the same API can be written for different hardware platforms, and the same generic application call to an API can be optimized for execution on different hardware platforms. Using a consistent API often enables the same application to be compiled into different executable code that can run on different hardware platforms with minimal customization for a particular hardware platform, and consequently, software developers would likely be reluctant to adopt an end-to-end physical rendering technique that requires software developers to work with a new API. Considering also that a developer may desire to use essentially the same software application on both hardware platforms that rely on raster-based rendering and hardware platforms that rely on physical rendering, the need to use a different API for physical rendering would be highly undesirable.

Therefore, a need also exists in the art for minimizing the burden on software developers wishing to utilize physical rendering techniques.

SUMMARY OF THE INVENTION

The invention addresses these and other problems associated with the prior art by providing a hybrid rendering architecture capable of interfacing a streaming geometry frontend with a physical rendering backend using a dynamic accelerated data structure (ADS) generator. The dynamic ADS generator effectively parallelizes the generation of the ADS, such that an ADS may be generated using a plurality of parallel threads of execution. By doing so, both the frontend and backend rendering processes are amenable to parallelization, and enabling if so desired real time rendering using physical rendering techniques such as ray tracing and photon mapping. Furthermore, conventional streaming geometry frontends such as OpenGL and DirectX compatible frontends can readily be adapted for use with physical rendering backends, thereby enabling developers to continue to develop with known API's, yet still obtain the benefits of physical rendering techniques.

Consistent with one aspect of the invention, a circuit arrangement is configured to render image data to a buffer. The circuit arrangement includes a streaming geometry frontend configured to stream a plurality of primitives for a scene, a dynamic accelerated data structure generator configured to receive the stream of primitives and dynamically build an accelerated data structure therefrom using a plurality of parallel threads of execution, and a physical rendering backend configured to complete rendering of the image data to the buffer using the accelerated data structure.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 7 is a block diagram of an exemplary hybrid rendering software pipeline consistent with the invention, and suitable for implementation in the thread pipelined software engine of FIG. 5.

FIG. 8 is a diagram of an exemplary scene for illustrating the dynamic generation of a geometry internal representation using the GIR generator of FIG. 7.

FIG. 9 is a block diagram of a geometry internal representation generated for the exemplary scene of FIG. 9.

DETAILED DESCRIPTION

Figure 1:
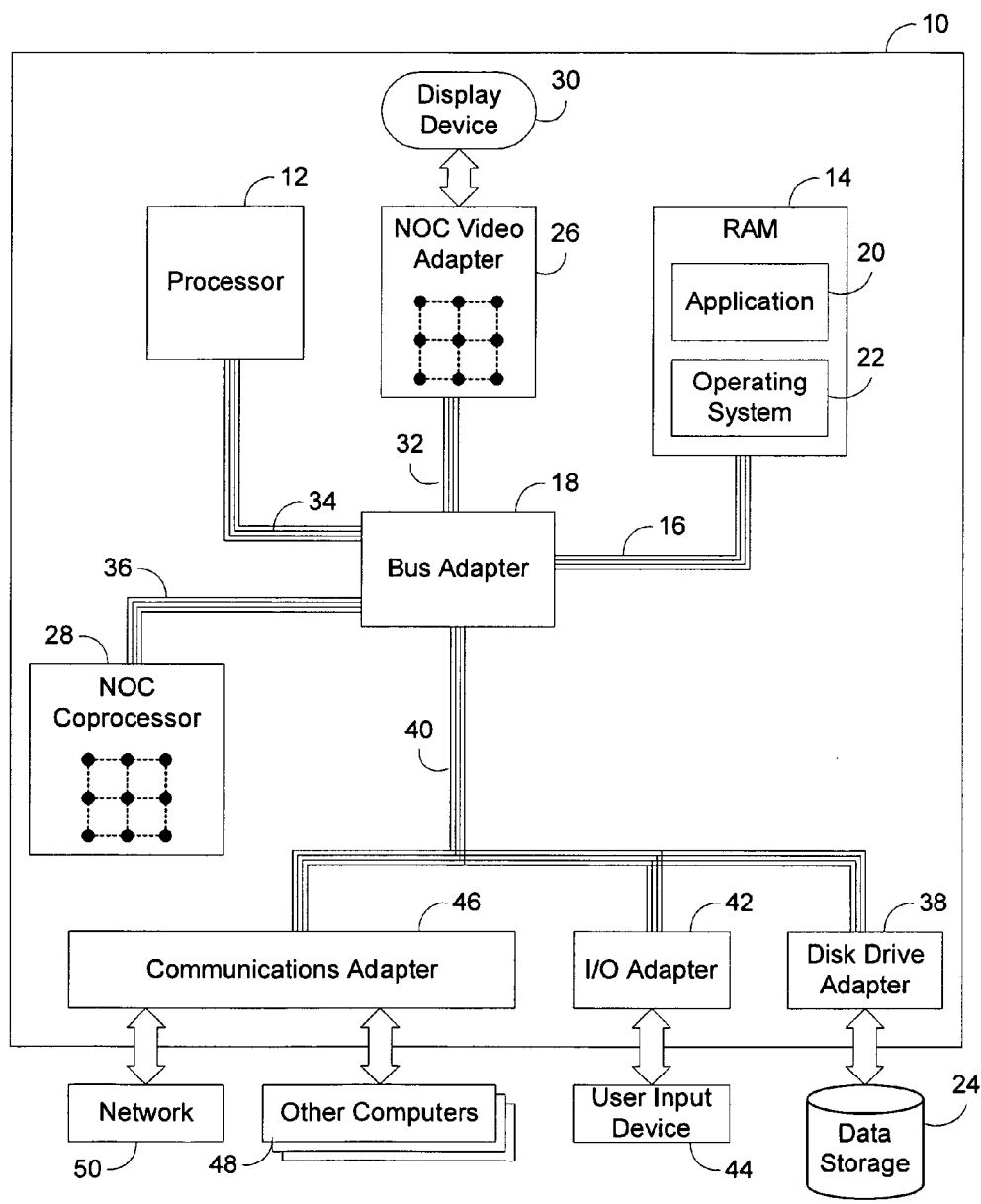
FIG. 1 is a block diagram of exemplary automated computing machinery including an exemplary computer useful in data processing consistent with embodiments of the present invention.

Embodiments consistent with the invention utilize a hybrid rendering architecture to interface a streaming geometry rendering frontend with a physical rendering backend using a dynamic accelerated data structure (ADS) generator. The dynamic ADS generator utilizes an algorithm that effectively parallelizes the generation of the ADS, such that a plurality of parallel threads of execution may be used to generate an ADS. In some embodiments, the dynamic ADS generator also enables the physical rendering backend to begin using the ADS prior to completion of the ADS by the dynamic ADS generator. By doing so, both the frontend and backend rendering processes, as well as the ADS generation process, are amendable to parallelization, enabling real time rendering using physical rendering techniques such as ray tracing and photon mapping. Furthermore, conventional streaming geometry frontends such as OpenGL and DirectX compatible frontends can readily be adapted for use with physical rendering backends, thereby enabling developers to continue to develop with known API's, as well as adapt existing software originally written for raster-based rendering for use in connection with physical rendering techniques.

A streaming geometry frontend consistent with the invention may include any geometry-based rendering frontend that is capable of generating an output stream of geometry primitives. Examples of suitable frontends include raster-based frontends such as OpenGL and DirectX compatible frontends; however, other frontends, whether or not typically associated with raster-based rendering techniques, may be used in the alternative. A physical rendering backend consistent with the invention may include any rendering backend that is based in whole or in part on physical modeling techniques. Examples include ray tracing or photon mapping backends; however, other physical rendering backends may be used in the alternative.

A dynamic accelerated data structure (ADS) generator consistent with the invention may include any ADS generating code capable of dynamically generating a data structure for storing primitives in a manner to facilitates fast and efficient determination of the locations of primitives within a scene, e.g., to determine if a ray in a ray tracing algorithm intersects any primitives within a three dimensional space. The embodiments illustrated hereinafter utilize a branch tree ADS implementation, although other dynamically-built data structures may also be used in the alternative. An ADS generator consistent with the invention may be integrated into a frontend or backend, or may be implemented separately from both, and simply used as an interface between the frontend and backend.

In addition, as will become more apparent below, a hybrid rendering architecture consistent with the invention may be implemented in a software pipeline embodied in a Network On Chip (NOC) hardware architecture that provides a flexible and highly parallel processing architecture suitable for parallelizing the frontend, backend and ADS generation operations performed in the hybrid rendering architecture. It will be appreciated, however, the invention may be implemented without a software pipeline and/or using other hardware architectures.

In one embodiment, for example, a computer program ordinarily configured to use a raster-based API may be adapted for use with a ray tracing or other physical rendering technique. The computer program provides object data representative of objects to be placed in a scene are received via a plurality of API calls to the raster-based API by the computer program, and the object data is processed in a raster-based streaming geometry frontend associated with the raster-based API to generate a stream of primitives for the scene. A dynamic ADS generator including a plurality of parallel threads of execution dynamically generates an accelerated data structure from the stream of primitives, and a ray tracing backend accesses the accelerated data structure and renders image data for the scene using the accelerated data structure.

Other variations and modifications will be apparent to one of ordinary skill in the art. Therefore, the invention is not limited to the specific implementations discussed herein.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM'i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
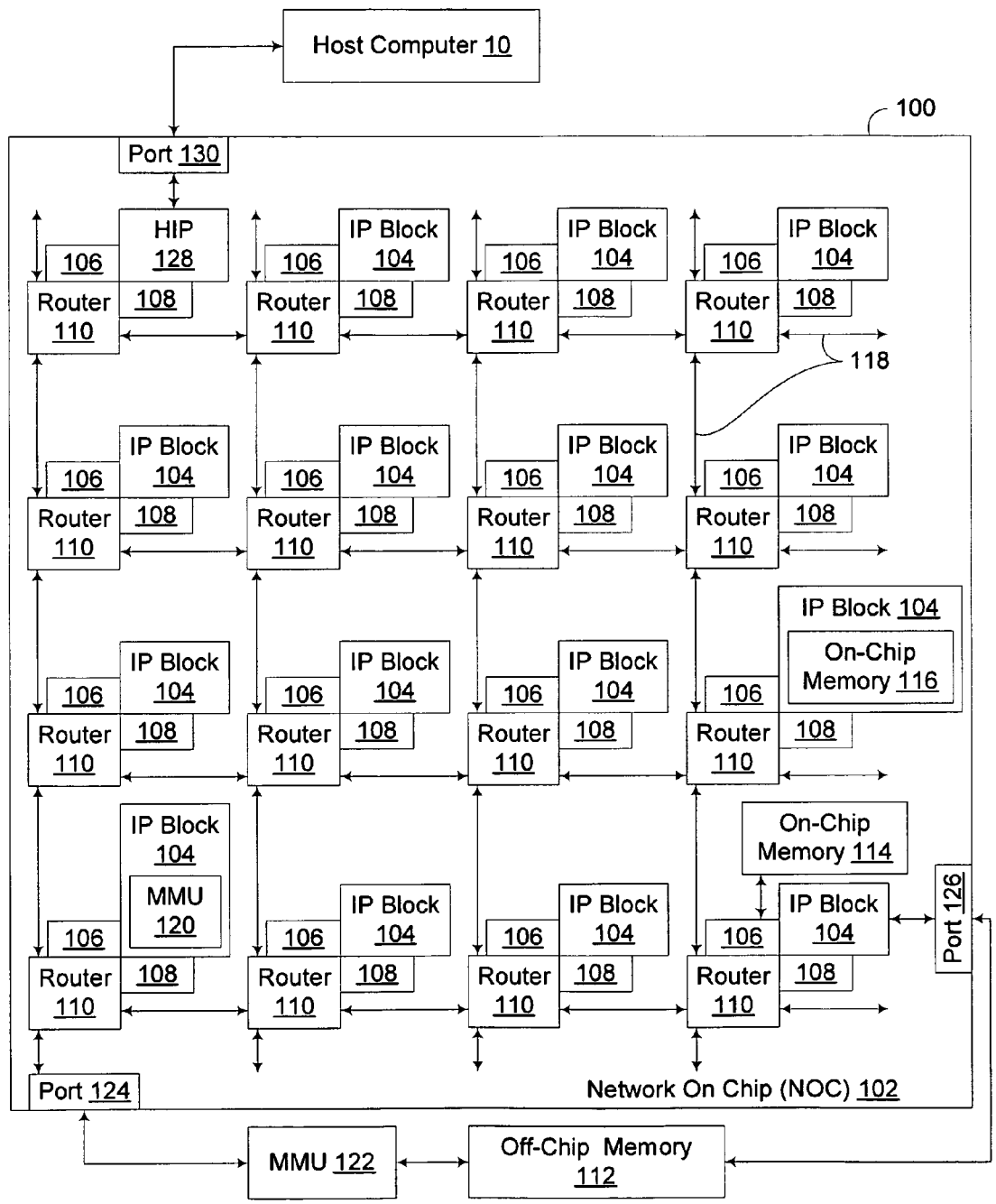
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
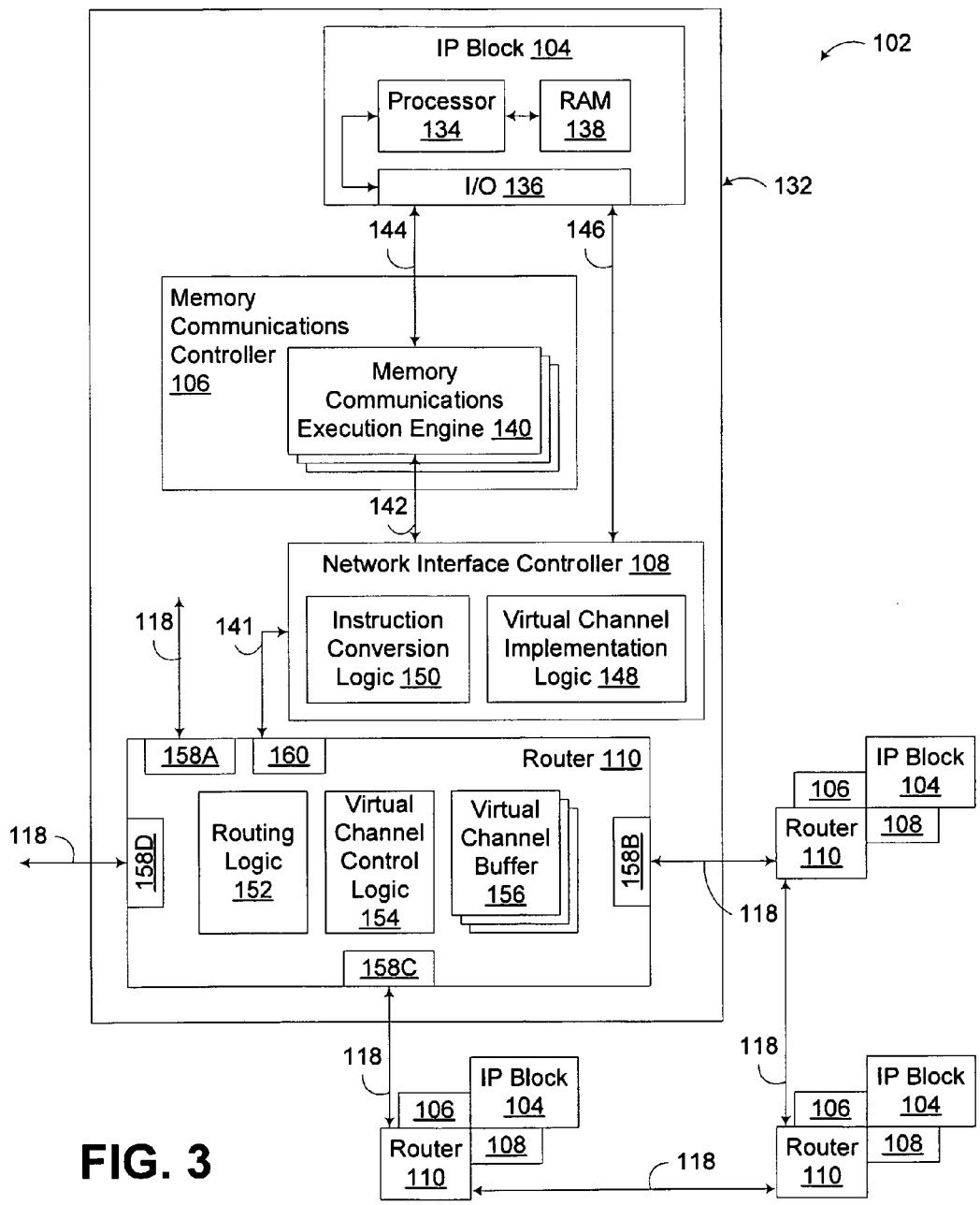
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions. Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bidirectional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
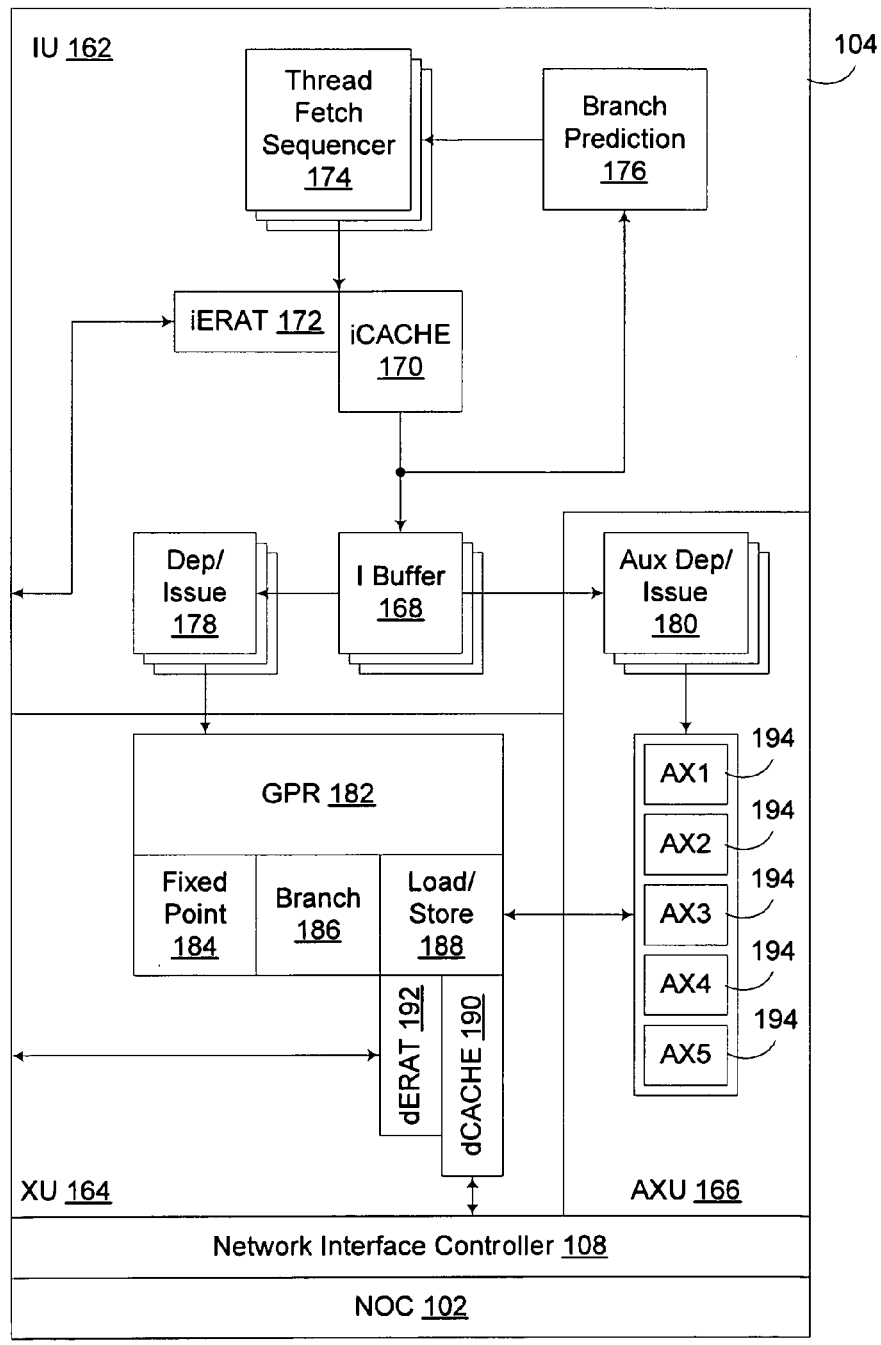
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32 b or 64 b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Software Pipelining

Figure 5:
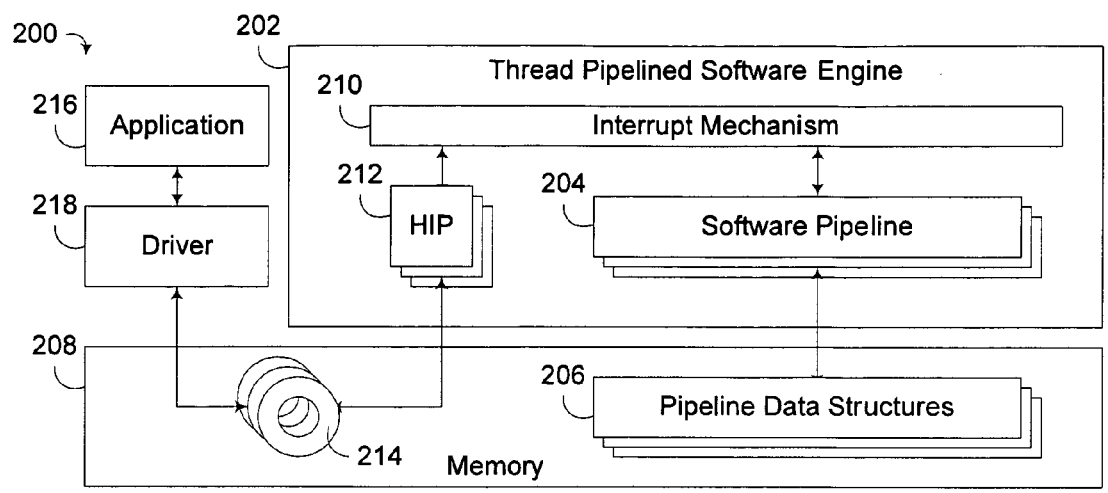
FIG. 5 is a block diagram of a thread pipelined software engine suitable for implementation in the NOC of FIG. 2.

Turning now to FIG. 5, NOC 102 may be used in some embodiments to implement a software-based pipeline. In particular, FIG. 5 illustrates an exemplary processing unit 200 incorporating a thread pipelined software engine 202 that may be used to implement and execute one or more software pipelines 204 on top of an NOC architecture. Each pipeline 204 is typically allocated one or more data structures 206 in a shared memory 208 to enable different stages of a pipeline to exchange data. Furthermore, an interrupt mechanism 210 is provided to enable stages of a pipeline to notify one another of pending work to be performed.

One or more host interface processors (HIP's) 212 are also provided in engine 202 to handle the issue of work to software pipelines 204. One or more push buffers 214 are provided to interface each HIP 212 with a software application 216 and driver 218, which are resident outside of the engine. In order to initiate work in a pipeline, a software application 216 issues requests through an appropriate driver 218 in the form of API calls, which then generates appropriate requests for the HIP and stores the requests in a push buffer 214. The HIP 212 for the relevant pipeline pulls work requests off of push buffer 214 and initiates processing of the request by the associated pipeline.

In the illustrated embodiment, and as implemented on a NOC 102, a software pipeline 204 implements a function that is segmented into a set of modules or 'stages' of computer program instructions that cooperate with one another to carry out a series of data processing tasks in sequence. Each stage in a pipeline is composed of a flexibly configurable module of computer program instructions identified by a stage ID with each stage executing on a thread of execution on an IP block 104 of a NOC 102. The stages are flexibly configurable in that each stage may support multiple instances of the stage, so that a pipeline may be scaled by instantiating additional instances of a stage as needed depending on workload. Because each stage is implemented by computer program instructions executing on an IP block 104 of a NOC 102, each stage is capable of accessing addressed memory through a memory communications controller 106. At least one stage, moreover, is capable of sending network-address based communications among other stages, where the network-address based communications maintain packet order.

The network-address based communications, for example, may be implemented using "inboxes" in each stage that receive data and/or commands from preceding stages in the pipeline. The network-address based communications maintain packet order, and are communications of a same type which are able to flow through the same virtual channel as described above. Each packet in such communications is routed by a router 110 in the manner described above, entering and leaving a virtual channel buffer in sequence, in FIFO order, thereby maintaining strict packet order and preserving message integrity.

Each stage implements a producer/consumer relationship with a next stage. The first stage receives work instructions and work piece data through a HIP 212, carries out its designated data processing tasks on the work piece, produces output data, and sends the produced output data to the next stage in the pipeline, which consumes the produced output data from the first stage by carrying out its designated data processing tasks on the produced output data from the first stage, thereby producing output data that is subsequently sent on to a next stage in the pipeline. This sequence of operations continues to the last stage of the pipeline, which then stores its produced output data in an output data structure for eventual return through the HIP 212 to the originating application 216.

Figure 6:
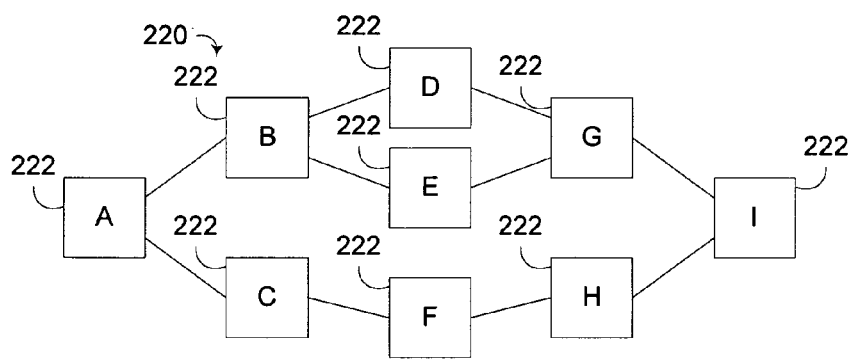
FIG. 6 is a block diagram of an exemplary software pipeline suitable for implementation in the thread pipelined software engine of FIG. 5.

The arrangement of stages in a pipeline may vary in different embodiments, as well as for performing different functions in different applications. FIG. 6, for example, illustrates an exemplary software pipeline 220 including a plurality of stage instances 222, also separately designated as instances A-I, each of which representing a thread of execution implemented on an IP block in NOC 102. The stage instances 222 are arranged in pipeline 220 into five stages, a first stage with instance A, a second stage with instances B and C, a third stage with instances D, E and F, a fourth stage with instances G and H, and a fifth stage with instance I. As can be seen from FIG. 6, instances may have a one-to-one, a one-to-many and/or a many-to-one relationship with other instances in the pipeline. Instances may operate collectively with one another in a particular stage to perform parallel tasks and share the workload, thus improving the overall throughput of the stage in performing the task. Instances in a stage may also perform different tasks from one another to enable the parallel performance of different tasks. Instances can supply data to more than one instance, while other instances may collect data and process data from multiple instances.

In the illustrated embodiment, each instance of each stage of a pipeline is typically implemented as an application-level module of computer program instructions executed on a separate IP block on a NOC, and each stage is assigned to a thread of execution on an IP block of a NOC. Each stage is assigned a stage ID, and each instance of a stage is assigned an identifier. HIP 212 (FIG. 5) typically sets up the pipeline by configuring each stage with a desired number of instances, with the network location of each instance of each stage provided to other instances of other stages to enable each instance to send its resultant workload to the proper instance in the next stage. earlier and/or later stage 3 to which an instance of stage 2 is authorized to send its resultant workload. Multiple instances may be assigned to a particular stage to provide additional processing resources relative to other stages, e.g., so work flows through the pipeline as efficiently as possible, and no single stage presents a bottleneck to performance. It will also be appreciated that workload monitoring may be performed during runtime, and that instances may be dynamically added or removed from a stage as needed for balancing the load among the stages of the pipeline.

Each stage is configured with a stage ID for each instance of a next stage, which may also include the number of instances in the next stage as well as the network location of each instance of that. Configuring a stage with IDs for instances of a next stage provides the stage with the information needed to carry out load balancing across stages. Such load balancing can be carried out, for example, by monitoring the performance of the stages and instantiating a number of instances of each stage in dependence upon the performance of one or more of the stages. Monitoring the performance of the stages can be carried out by configuring each stage to report performance statistics to a separate monitoring application that in turn is installed and running on another thread of execution on an IP block or HIP. Performance statistics can include, for example, time required to complete a data processing task, a number of data processing tasks completed within a particular time period, and so on, as will occur to those of skill in the art. Instantiating a number of instances of each stage in dependence upon the performance of one or more of the stages can be carried out by instantiating, by an HIP, a new instance of a stage when monitored performance indicates a need for a new instance.

Hybrid Rendering Architecture

Now turning to FIG. 7, this figure illustrates an implementation of processing unit 200 configured to implement a hybrid rendering architecture consistent with the invention. In particular, FIG. 7 illustrates a hybrid rendering software pipeline 230 incorporating a streaming geometry frontend 232 interfaced with a ray tracing backend 234 via a GIR generator 236. Streaming geometry frontend 232 may be implemented, for example, as an OpenGL or DirectX compatible frontend, e.g., as is used in a number of different raster-based techniques, that streams a set of primitives for a scene. Frontend 232 also may natively support the OpenGL or DirectX API's, and as such, may be accessed by an application 216 developed for use with a raster-based rendering algorithm via API calls that are converted by driver 218 into work requests, which are sent to HIP 212 via push buffer 214 to initiate implementation of those API calls by frontend 232.

GIR generator 236, in turn, processes the stream of primitives output by streaming geometry frontend 232 to dynamically generate and store a geometry internal representation (GIR) data structure 238 in memory 208. GIR 238 functions as an accelerated data structure, and as such is used by ray tracing backend 234 to render a frame of image data for a scene to a frame buffer 240. GIR generator 236 dynamically generates the GIR using a plurality of parallel threads of execution, and as such, reduces the likelihood of GIR generation serving as a bottleneck on overall performance. In addition, if desired, backend 234 is permitted to begin accessing the GIR in parallel with the GIR generator dynamically building the GIR, and prior to the GIR generator completing the GIR. As an alternative, backend 234 may not operate on the GIR until after construction of the GIR is complete. As yet another alternative, frontend 232 and backend 234 may operate on different frames of data, such that frontend 232 streams primitive data to GIR generator 236 to build a GIR for one frame while backend 234 is processing the GIR for an earlier generated frame.

So configured, streaming frontend 232, GIR generator 236 and ray tracing backend 234 are each amenable to execution by a plurality of parallel threads of execution. Furthermore, GIR generator 236 serves to adapt the output of a streaming geometry frontend, ordinarily configured for use with a raster-based backend, for use with a physical rendering backend such as a ray tracing or photon mapping backend. As such, the same API as would be used for a raster-based rendering technique may be repurposed for physical rendering, often without requiring changes to the API or to an application that makes calls to the API.

Dynamic ADS Generation

An ADS may be used to enable a physical rendering algorithm such as a ray tracing algorithm to quickly and efficiently determine with which regions of a scene an issued ray intersects any objects within a scene to be rendered. An ADS may be implemented, for example, as a spatial index, which divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume then there is no need to run ray-primitive intersection tests against the primitives contained within that volume. Furthermore, if a ray intersects a bounding volume that does not contain primitives then there is no need to run ray-primitive intersections tests against that bounding volume. Thus, by reducing the number of ray-primitive intersection tests that may be necessary, the use of a spatial index greatly increases the performance of a ray tracing image processing system. Some examples of different spatial index acceleration data structures are oct-trees, k dimensional Trees (kd-Trees), and binary space partitioning trees (BSP trees). While several different spatial index structures exist, and may be used in connection with the physical rendering techniques disclosed herein, the illustrated embodiments rely on a branch tree implemented as a base b tree split up into smaller trees of depth k.

By way of example, FIGS. 8 and 9 illustrate a relatively simple branch tree implementation that uses axis aligned bounding volumes to partition the entire scene or space into smaller volumes. That is, the branch tree may divide a three-dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a branch tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented, for example, by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned branch tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

FIG. 8, for example, illustrates an example two dimensional space to be rendered by an image processing system, while FIG. 9 illustrates a corresponding branch tree 258, comprising nodes 260-268, for the primitives shown in FIG. 8. For simplicity, a two dimensional scene is used to illustrate the building of a branch tree, however branch trees may also be used to represent three-dimensional scenes. In the two dimensional illustration of FIG. 8, for example, splitting lines are illustrated instead of splitting planes, and bounding areas are illustrated instead of bounding volumes as would be used in a three-dimensional structure. However, one skilled in the art will quickly recognize that the concepts may easily be applied to a three-dimensional scene containing objects.

FIG. 8 illustrates a two dimensional scene 250 containing primitives 252A, 252B and 252C to be rendered in the final image. The largest volume which represents the entire volume of the scene is encompassed by bounding volume 1 ($BV_1$) (which is not shown separately in FIG. 8 because it encompasses the entire scene. In the corresponding branch tree this may be represented by the top level node 260, also known as the root or world node. In one embodiment, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives.

Thus, for example, as can be seen in FIG. 8, $BV_1$ may be broken into two smaller bounding volumes $BV_2$ and $BV_3$ by drawing a splitting plane 254 along the x-axis at point $X_1$. This partitioning of $BV_1$ is also reflected in the branch tree as the two nodes 262 and 264, corresponding to $BV_2$ and $BV_3$ respectively, under the internal or parent node $BV_1$ 260. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

Bounding volume $BV_3$ may then be broken into two smaller bounding values $BV_4$ and $BV_5$ by drawing a splitting plane 256 along the y-axis at point $Y_1$. Since $BV_3$ has been partitioned into two sub-nodes it may now be referred to as an internal node. The partitioning of $BV_3$ is also reflected in the branch tree as the two leaf nodes 266 and 268, corresponding to $BV_4$ and $BV_5$, respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the branch tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $Y_1$).

Thus, if a traced ray is projected through a point (X, Y) in bounding volume $BV_5$, a ray tracing algorithm may quickly and efficiently determine what primitives need to be checked for intersection by traversing through the tree starting at node 260, determining from the X coordinate of the point that the point is in bounding volume $BV_3$ and traversing to node 264, determining from the Y coordinate of the point that the point is in bounding volume $BV_5$ and traversing to node 268. Node 268 provides access to the primitive data for primitives 252C, and thus, the ray tracing algorithm can perform intersection tests against those primitives.

Figure 10:
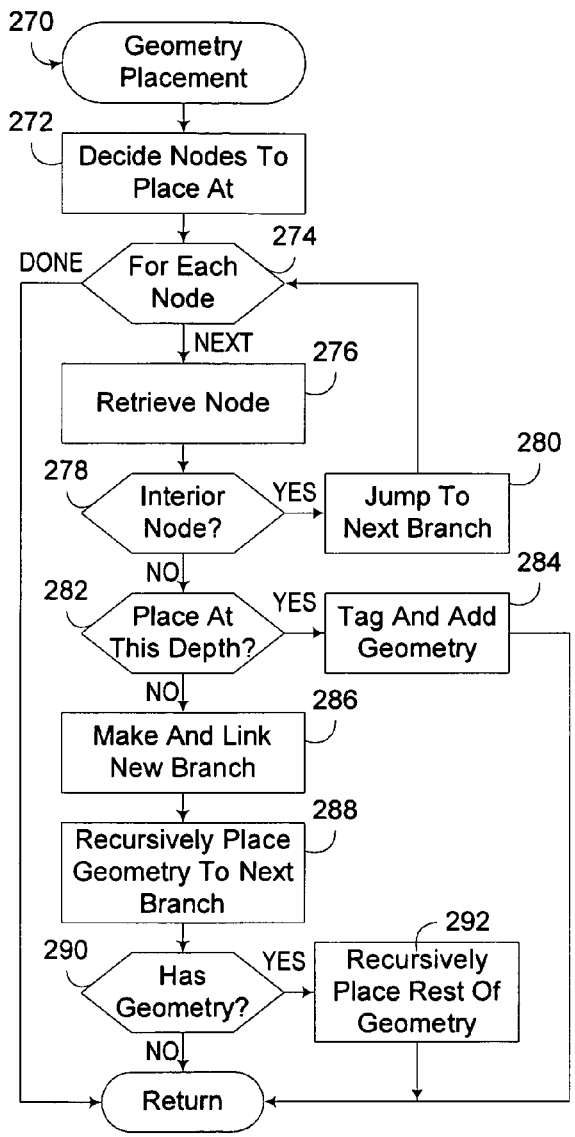
FIG. 10 is a flowchart illustrating the program flow of a geometry placement routine executed by the GIR generator of FIG. 7.
Figure 11:
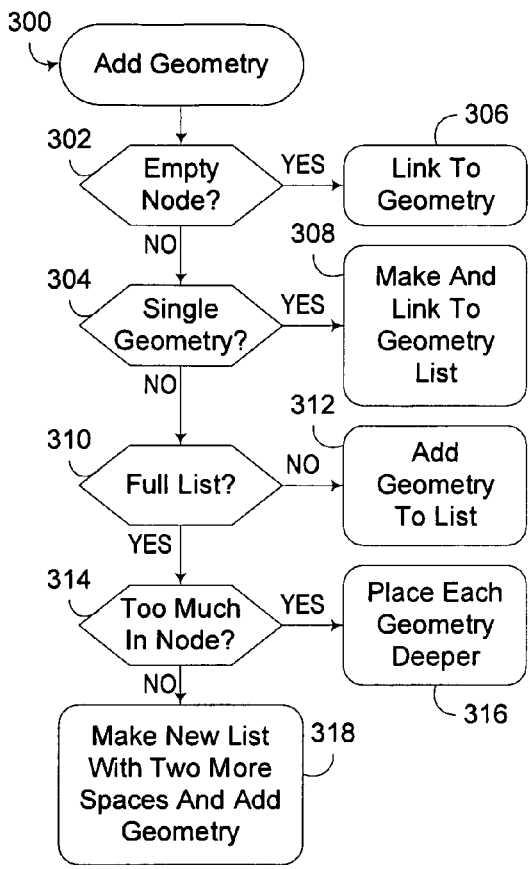
FIG. 11 is a flowchart illustrating the program flow of an add geometry routine executed by the GIR generator of FIG. 7.

FIGS. 10 and 11 next illustrate a branch tree generation algorithm suitable for use in GIR generator 236 to generate a GIR implemented as a form of branch tree that is capable of being generated in a highly parallel manner. The herein-described branch tree generation algorithm generates a dynamically built accelerated data structure (ADS) for streaming data on a highly parallel machine, based upon a relatively building and traversal algorithm, that uses minimal memory and memory bandwidth, and that typically requires no additional information than common rendering API's such as DirectX and OpenGL currently supply.

A branch tree generated by the herein-described embodiment is implemented as a base b tree split up into smaller trees of depth k, where each small tree may be referred to as a branch. If a leaf node in the branch is an interior node of the larger tree it will contain a pointer to another branch continuing the tree. If objects are only allowed to be placed at leaf nodes of the smaller trees there is no need to contain the upper levels of the depth k tree and the tree can therefore be looked at as a base $b^k$ tree. In one embodiment, the branch tree is an oct-tree split up into small trees of depth 2 that allows data to be stored only at even levels, which is essentially equivalent to a base 64 tree.

The branch tree may also be considered as an expanding grid. An initial grid of 64 voxels is made. If small enough geometry exists inside one of these voxels, another 64 voxel grid, or branch, is made inside it. The pattern is continued until a significant or maximum depth of grids/branches is reached. From the standpoint of storage, however, each branch is stored simply as 64 nodes, as shown below:

```
struct branch{
    node nodes[64];
};
```

In the illustrated embodiment, the nodes of the branch are 4-byte words that either contain a pointer to geometry, list of geometry, a null value, or an indexed offset to another branch. If a node in the branch contains one or more pieces of geometry it will contain a pointer to the geometry or list of geometry. It is desirable for the address of the geometry or geometry list to be larger than the number of branches that will make the tree as the node data type may be determined by the node's unsigned integer value being larger or smaller than this threshold. If a node is empty it contains a null value. If it is an interior node it contains an offset to the branch that continues the tree beyond it. The offset is an index into a list of branches that is built during the construction process of the tree. For example, a node may have a structure such as:

```
struct node{
    union {
        uint offset;
        geometry *geo;
        geometry_list * geo_list;
    };
}
``` while a geometry list may have a structure such as:

```
struct geometry_list{
    uint num_geometry;
    geometry * geo_ptr;
};
```

In the illustrated embodiment, the construction of the branch tree is designed to be performed dynamically and in parallel. The algorithm relies on two global variables, a pointer to the memory allocated for the tree and an integer next_offset that stores an index into this memory where a newly built branch can be stored. The index can either be shared globally or reserved memory can be split into groups to allow multiple next_offset pointers to be used. For simplicity of description, a single next_offset will be assumed; however, multiple offsets may be desirable in some embodiments to reduce memory conflicts.

The algorithm also is provided with the maximum depth allowed by the tree. Because float numbers have a 24 bit significant, it may be desirable to enable each depth of a base 64 tree to use two bits in each direction, such that a maximum depth of max_d=12 may be used. A depth twelve base 64 branch tree has the equivalent precision to a $64^{12}$ voxel grid.

To initialize the tree, the next_offset is set to 65 and a branch with all empty nodes (null value) is written to the first branch (top branch) in the memory allocation. No other steps are required.

Thereafter, each streamed geometry primitive from the streaming geometry frontend is placed into the scene, using an instance of a routine such as routine 270 of FIG. 10. Thus, the GIR generator is configured to execute an instance of a placement routine in each of the plurality of parallel threads of execution allocated to the GIR generator to insert a plurality of primitives into the branch tree in parallel.

The placement function receives as input a pointer to the geometry and the three dimensional mins and maxs converted from float world coordinates to integer grid coordinates. The grid coordinates assume a step size of one at the maximum depth. In addition, by using a few compares instead of masks, the tree building process can typically be performed without float to integer conversion.

Routine 270 begins in block 272 by deciding at which nodes to place the geometry primitive. This process typically involves building keys from the min and max values. The keys can be built either with compares or from floats converted to integer values. In the illustrated embodiment, a compare with integer values is used. A 6 bit key is the node index in the current branch and is built of a set of x, y and z integer values for a point. The equation for building the tree is:

$$node\_key[0:5] = \{x/2^*(max\_d-d):+1], y/2^*(max\_d-d):+1], z/2^*(max\_d-d):+1]\};$$

where d is the current depth of the branch and max_d is the maximum depth of the tree where the nodes are cubes of integer volume 1.

The algorithm can find all nodes relating to the geometry primitive by finding the x, y, and z components of the keys for the geometry's min and max points, and generating all possible keys between and including the min and max values. More precise methods may be used in the alternative.

Thus, block 274 initiates a FOR loop, and for each node, retrieves the node in block 276, determines whether the node is an interior node in block 278, and if not, jumps to the next branch in block 280.

If, however, a node is determined to be a leaf node, rather than an interior node, block 278 passes control to block 282 to determine whether to place the geometry primitive at the current depth in the tree. Two factors may be used to make this determination. The first is what type of node it is in. If the node is an interior node then geometry exists below it and it will not be placed at that level, which is determined in block 278. The second factor is the size of the geometry primitive. In the illustrated embodiment, the geometry primitive is placed if the node width is greater than four times the magnitude of the vector from the geometry primitive's min to max.

If the decision is made to place the geometry primitive, control passes to tag and add the geometry primitive in block 284, whereby the primitive is placed and the current iteration of routine 270 is complete. If it is decided to not place the geometry primitive at the current depth, the node is expanded in blocks 286, 288, 290 and 292. Specifically, block 288 recursively calls routine 270 to place the geometry primitive in the new branch. Block 290 determines if any other geometry exists in the node, and if so, passes control to block 292 to recursively place the other geometry in the node by calling routine 270 for each tagged geometry primitive in the node. Upon completion of block 292, or if the node is otherwise empty as determined in block 290, routine 270 is complete.

Thus, in the case of the node being an empty node, a new empty branch is created at the location indicated by *next_offset. The value of *next_offset is then stored in the expanding node and is incremented. This is how the tree is expanded and built. If the node contains existing tagged geometry primitives, the geometry is buried in order to turn the current node into an interior node. The existing geometry is buried after placing the new geometry primitive as it is smaller and will go deeper than the tagged geometry. As such, routine 270 ensures that all geometry gets pushed to the leaf nodes as they are expanded. Routine 270 therefore dynamically expands the branch tree whenever a primitive needs to be inserted into a full branch.

FIG. 11 illustrates an add geometry routine 300 that may be called, for example, in block 284 of routine 270 (FIG. 10). Routine 300 first determines what state (empty, single geometry, geometry list) the node is in using blocks 302 and 304 and acts accordingly.

If the node's value is 0, the node is empty, and as such, block 302 passes control to block 306 to link to the new geometry by replacing the value in the node with a pointer to the geometry primitive being placed, whereby routine 300 will be complete. If the node has a non-zero value, block 304 determines whether the node stores a pointer to a single geometry primitive or a list of geometry, by loading the value at the pointed to address as an unsigned integer. If this integer value is inclusively between one and the maximum number of primitives allowed (e.g., 15), the pointer is determined to be a geometry_list pointer, as the value is the num_geometry component of a geometry_list. Otherwise, the value is considered to be a single geometry primitive.

It is important to note that float values or binary values equal to integer values of 1 through 15 are permitted. In addition, by avoiding processing of a list when only a single geometry primitive exists in a node can save a significant amount of time and memory but is only applicable if either only one type of geometry primitive exists in a scene or if the geometry primitive is provided with a type header. Otherwise some sort of list will be required for all primitives.

Geometry lists in the illustrated embodiment have an integer num_geometry indicating how many pieces of geometry are in the list, and a list of pointers to geometry. The allocated space for the number of pointers is even to lower the number of reallocations necessary. Therefore when a new piece of geometry is added to the list, if the num_geometry value is even, new memory space is allocated. If it is not even, a pointer to the geometry is simply appended to the end of the pointer list. Num_geometry is incremented in both cases.

As such, if block 304 determines the node includes a single geometry primitive, control passes to block 308 to make a geometry list and add a link for the new geometry primitive to the new list. Otherwise, block 304 passes control to block 310 to determine if the list is full. If not, block 312 adds the geometry primitive to the list. If the list is full, block 314 determines if there are too many primitives in the node. If not, a new list is created with two additional spaces in block 316, and the new geometry primitive is linked into the list. If the node is too full, however, block 318 buries the new and existing geometry primitives by recursively calling routine 270.

Of note, routines 270 and 300 are capable of being used in a parallel hardware architecture, as multiple instantiations of such routines may be used to concurrently place different primitives in the same branch tree. Consequently, assuming sufficient numbers of parallel threads of execution are allocated to an ADS generator that implements such routines, the generation of an ADS may occur at the same rate as primitives are streamed from the streaming geometry frontend, and once all of the primitive data has been streamed for a scene from the streaming geometry frontend, a fully constructed ADS is almost immediately available for use by a physical rendering backend.

Figure 12:
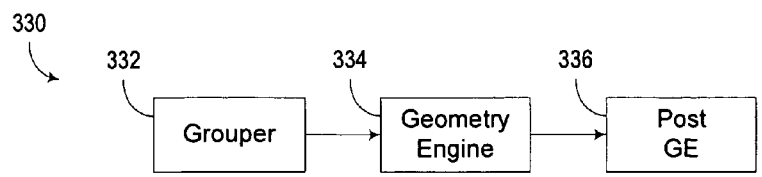
FIG. 12 is a block diagram of an exemplary implementation of the streaming geometry frontend referenced in FIG. 7.

Now turning to FIG. 12, as noted above, a number of streaming geometry frontends may be used consistent with the invention. FIG. 12, for example illustrates a raster-based streaming geometry frontend 330 including a grouper 332, geometry engine 334 and post geometry engine module 336. Grouper 332 groups data for streaming down the pipeline, while geometry engine 334 performs object transformations and generates the geometry primitives. Module 336 performs operations such as perspective divides, culling, sorting, or breaking up geometry, and the end result output of module 336 is a stream of geometry primitives. It will be appreciated that a wide variety of streaming geometry frontend architectures may be used consistent with the invention, and as such, the invention is not limited to the particular architecture illustrated in FIG. 12.

Figure 13:
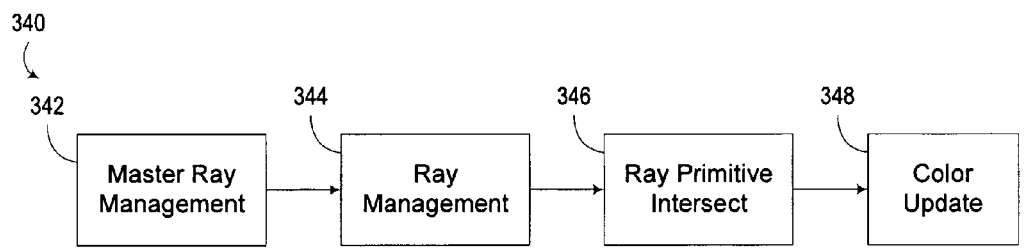
FIG. 13 is a block diagram of an exemplary implementation of the ray tracing backend referenced in FIG. 7.

FIG. 13 next illustrates a ray tracing implementation of a physical rendering backend 340 consistent with the invention. Backend 340 includes a master ray management module 342 that handles interfacing with the rendering front end, initiating and synchronizing all initial rays, performing performance monitoring and dynamic (or static) load balancing. One or more other ray management modules 344 functions as a slave ray manager that receives rays from the master or other slaves and traverses the ADS until determining if the ray intersects with a full leaf node or not. If not, the default background color is applied. If so, the ray is sent to a ray primitive intersect module 346, which determines the intersections between rays and primitives. A color update module 348 updates pixels in a scene based upon the intersections detected between rays and primitives. It will be appreciated that a wide variety of ray tracing backend architectures may be used consistent with the invention, and as such, the invention is not limited to the particular architecture illustrated in FIG. 13.

Figure 14A:
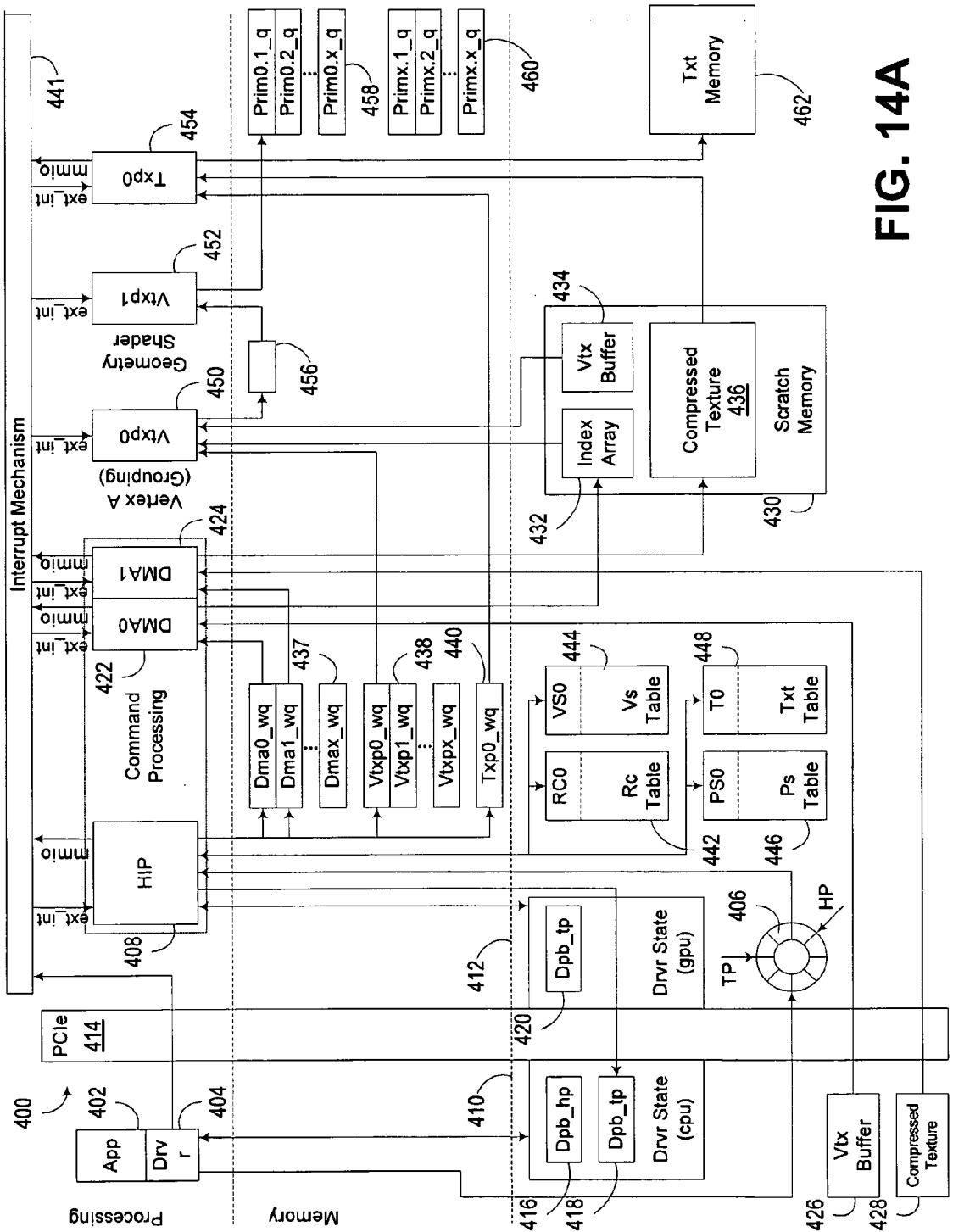
FIGS. 14A and 14B collectively illustrate in greater detail an implementation of the hybrid rendering software pipeline of FIG. 7.
Figure 14B:
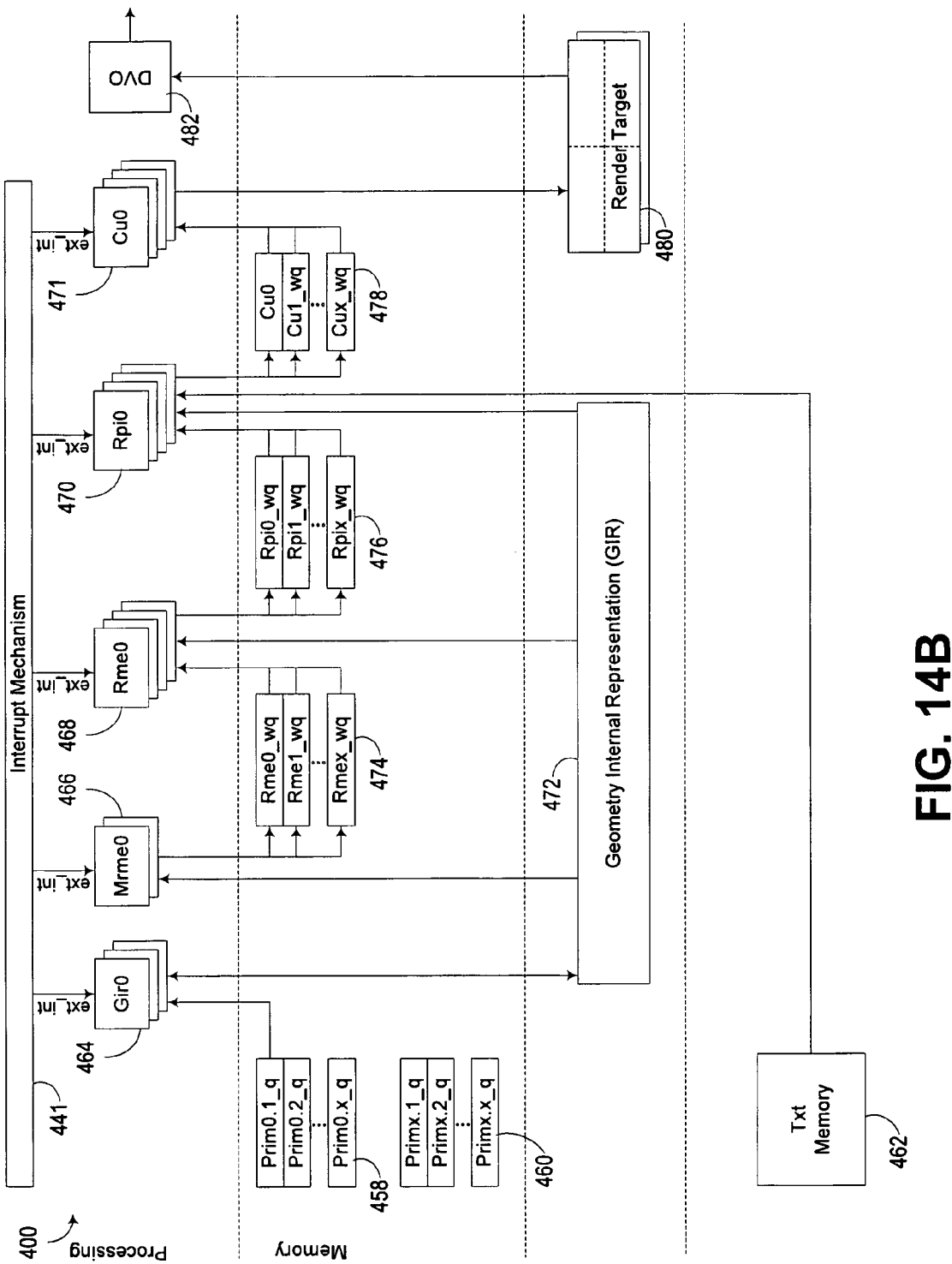

Implementation of a software pipeline to implement the aforementioned hybrid rendering functionality is illustrated at 400 in FIGS. 14A and 14B. FIG. 14A, in particular primarily illustrates the frontend aspects of the architecture, while FIG. 14B primarily illustrates the backend aspects of the architecture. Software pipeline 400 is implemented by a NOC resident in a graphics processor unit (GPU) coupled to a host processor (CPU) via a bus, e.g., a PCI express bus 414.

As shown in FIG. 14A, an application 402 utilizes a driver 404 to submit work requests to the software pipeline via a push buffer 406. Application 402 and driver 404 are executed on the CPU, while push buffer 406 is resident in shared memory accessible to both the CPU and the GPU. Work requests are pulled from push buffer 406 by command processing logic, and in particular a host interface processor (HIP) 408. In addition, driver state information is maintained in allocated memory 410, 412 in the CPU and GPU, respectively. The states of the push buffer head and tail pointers for push buffer 406 are maintained at 416 and 418 in memory 410 while the state of the tail pointer is maintained at 420 in memory 420.

HIP 408 sets up the software pipeline, assigns threads of execution to stage instances in the pipeline, issues work requests to the pipeline, and monitors workflow to dynamically reallocate threads of execution to different stages of the pipeline to maximize throughput and minimize bottlenecks. In this regard, HIP 408, which is itself typically implemented in an IP block from a NOC, assigns one or more IP blocks to handle each stage of the pipeline, as well as other supporting logic that may be required to manage operation of the pipeline. A thread of execution in this regard constitutes a hardware thread implemented within an IP block, it being understood that in IP blocks that support multiple hardware threads, multiple stage instances in a pipeline may be assigned to different threads in the same IP block.

Examples of supporting logic include DMA engines 422, 424, which are respectively used to DMA vertex data from a vertex buffer 426 and compressed texture data from a texture data buffer 428. A scratch memory 430, including an index array 432, vertex buffer 434 and compressed texture data 436, serves as a destination for DMA engines 422, 424. HIP 408 sets up a set of inboxes 437 in DMA engines 422, 424 to receive work requests from the HIP. One inbox 437 is provided for each DMA engine activated in the pipeline.

An interrupt mechanism 441 is used in software pipeline 400 to enable inter-node communication between logical units in the pipeline. Nodes, e.g., HIP 408 and DMA engines 422, 424 receive interrupts from mechanism 441, and are capable of issuing interrupts to other nodes via memory mapped input/output (MMIO) requests issued to the interrupt mechanism.

The frontend of pipeline 400 is implemented by a vertex processor including a first unit 450 configured as a grouper and a second unit 452 configured as a geometry shader, and a texture processor 454.

HIP 408 initiates work in the vertex processor 450, 452 and texture processor 454 using inboxes 438, 440. At least one inbox 438 is allocated for each unit in the vertex processor, and at least one inbox 440 is allocated for each unit in texture processor 454. In addition, HIP is capable of writing data to a render context table 442, vertex sort table 444, primitive sort table 446 and texture context table 48. Vertex processor unit 450 is responsive to requests fed to an inbox 438, and retrieves working data from index array 432 and vertex buffer 434. Unit 450 communicates with vertex processor unit 452 via an inbox 456 and unit 452 outputs primitives to an array of inboxes 458, 460. Texture processor 454 receives requests from an inbox 440, reads texture data 436 from scratch memory 430 and outputs to a texture memory 462.

As shown in FIG. 14B, a set of inboxes 458, 460 is allocated for each of a plurality of GIR generator elements 464 that collectively implement a GIR generator, enabling the frontend of the pipeline to provide primitive data for use in building a GIR 472. As noted above, a plurality of parallel threads of execution, e.g. one or more per element 464, is used to generate the GIR in the manner described above.

One or more master ray management elements 466, one or more ray management elements 468, one or more ray primitive intersect elements 470 and one or more color update elements 471 respectively implement a ray tracing backend. A variable number of threads of execution may be allocated for each type of element 466, 468, 470, 471 in order to optimize throughput through the software pipeline. Elements 466, 468 and 470 use the GIR 472 to perform ray tracing operations, while elements 470 retrieves texture data from texture memory 462. Communication between stages of the backend is provided by inboxes 474, 476 and 478, respectively allocated to elements 468, 470 and 471. Color update elements 471 output image data to a render target 480, e.g., an image buffer, which is then output via digital video out circuit 482.

It will be appreciated that the implementation of a streaming geometry frontend and a ray tracing backend into the software pipeline elements and underlying NOC architecture would be well within the abilities of one of ordinary skill in the art having the benefit of the instant disclosure. It will also be appreciated that different numbers of elements may be used to implement each stage of the software pipeline, and that different stages may be used to implement the frontend and/or backend of the pipeline based upon the particular algorithms used thereby. Furthermore, by actively monitoring the workload of each stage of the pipeline, it may be desirable in some embodiments to dynamically change the allocation of IP blocks and threads of execution to different stages of the pipeline, thus providing optimal throughput for different types of tasks.

Therefore, embodiments consistent with the invention enable a hybrid rendering process to be implemented in a highly parallel computing architecture to mate a streaming geometry front end with a physical rendering backend, and utilizing an accelerated data structure generator that dynamically builds an accelerated data structure using a plurality of parallel threads of execution. In addition, embodiments consistent with the invention enable conventional streaming geometry frontends such as OpenGL and DirectX compatible frontends to be used with physical rendering backends, often enabling developers to continue to develop with known API's developed for raster-based rendering backends, and adapt existing applications originally developed for raster-based rendering backends with reduced effort.

Various modifications may be made without departing from the spirit and scope of the invention. Therefore, the invention lies in the claims hereinafter appended.

What is claimed is:

1. A method of adapting a computer program configured to use a raster-based application programming interface (API) for use with a ray tracing rendering technique, the method comprising:

receiving from the computer program object data representative of objects to be placed in a scene via a plurality of API calls to the raster-based API;

processing the object data in a raster-based streaming geometry frontend associated with the raster-based API to generate a stream of primitives for the scene;

using a dynamic accelerated data structure generator including a plurality of parallel threads of execution to dynamically generate an accelerated data structure from the stream of primitives, wherein the accelerated data structure partitions the scene into a plurality of bounding volumes and arranges primitives from the stream of primitives within the plurality of bounding volumes; and with a ray tracing backend, accessing the accelerated data structure to determine whether any primitives are arranged within a bounding volume in the scene through which a ray is being projected and rendering image data for the scene using the accelerated data structure.

2. A circuit arrangement configured to render image data to a buffer, comprising:

a streaming geometry frontend configured to stream a plurality of primitives for a scene;

a dynamic accelerated data structure generator configured to receive the stream of primitives and dynamically build an accelerated data structure therefrom using a plurality of parallel threads of execution, wherein the accelerated data structure partitions the scene into a plurality of bounding volumes and arranges primitives from the stream of primitives within the plurality of bounding volumes; and a physical rendering backend configured to complete rendering of the image data to the buffer using the accelerated data structure to determine whether any primitives are arranged within a bounding volume in the scene, wherein the physical rendering backend renders the image data based upon a non-raster-based physical modeling technique.

3. The circuit arrangement of claim 2, wherein the streaming geometry frontend comprises a raster-based streaming geometry frontend.

4. The circuit arrangement of claim 3, wherein the streaming geometry frontend comprises an OpenGL compatible rendering frontend.

5. The circuit arrangement of claim 3, wherein the streaming geometry frontend comprises a DirectX compatible frontend.

6. The circuit arrangement of claim 2, wherein the physical rendering backend comprises a ray tracing backend.

7. The circuit arrangement of claim 2, wherein the physical rendering backend comprises a photon mapping backend.

8. The circuit arrangement of claim 2, wherein the physical rendering backend is configured to use the accelerated data structure in parallel with the dynamic accelerated data structure generator dynamically building the accelerated data structure.

9. The circuit arrangement of claim 2, wherein the streaming geometry frontend, dynamic accelerated data structure generator and physical rendering backend are disposed in a software pipeline implemented on an interconnected set of hardware-based processing elements, and wherein the plurality of parallel threads of execution used by the dynamic accelerated data structure generator are each executed by separate hardware threads disposed on at least one of the plurality of processing elements.

10. The circuit arrangement of claim 9, wherein the interconnected set of hardware-based processing elements comprises a plurality of nodes interconnected to one another in a Network On Chip (NOC) arrangement.

11. The circuit arrangement of claim 2, wherein the accelerated data structure comprises a base b branch tree split up into a plurality of branches of depth k, and wherein the dynamic accelerated data structure generator is configured to dynamically expand the branch tree whenever a primitive needs to be inserted into a full branch.

12. The circuit arrangement of claim 11, wherein the dynamic accelerated data structure generator is configured to execute an instance of a placement routine in each of the plurality of parallel threads of execution to insert a plurality of primitives into the branch tree in parallel.

13. An integrated circuit device including the circuit arrangement of claim 2.

14. The circuit arrangement of claim 2, wherein the dynamic accelerated data structure generator is configured to dynamically partition a first bounding volume among the plurality of bounding volumes into multiple bounding volumes contained within the first bounding volume and rearrange primitives arranged in the first bounding volume into the multiple bounding volumes.

15. A method of rendering image data to a buffer, the method comprising:

receiving object data representative of objects to be placed in a science;

processing the object data in a streaming geometry frontend to stream a plurality of primitives for the scene;

using a dynamic accelerated data structure generator including a plurality of parallel threads of execution to dynamically build an accelerated data structure from the stream of primitives, wherein the accelerated data structure partitions the scene into a plurality of bounding volumes and arranges primitives from the stream of primitives within the plurality of bounding volumes; and with a physical rendering backend, accessing the accelerated data structure to determine whether any primitives are arranged within a bounding volume in the scene and rendering image data for the scene using the accelerated data structure, wherein the physical rendering backend renders the image data based upon a non-raster-based physical modeling technique.

16. The method of claim 15, wherein the streaming geometry frontend comprises a raster-based streaming geometry frontend.

17. The method of claim 16, wherein the streaming geometry frontend comprises an OpenGL compatible rendering frontend.

18. The method of claim 16, wherein the streaming geometry frontend comprises a DirectX compatible frontend.

19. The method of claim 16, wherein the physical rendering backend comprises a ray tracing backend.

20. The method of claim 16, wherein the physical rendering backend comprises a photon mapping backend.

21. The method of claim 16, further comprising, with the physical rendering backend, using the accelerated data structure in parallel with the dynamic accelerated data structure generator dynamically building the accelerated data structure.

22. The method of claim 16, wherein the streaming geometry frontend, dynamic accelerated data structure generator and physical rendering backend are disposed in a software pipeline implemented on an interconnected set of hardware-based processing elements, and wherein the plurality of parallel threads of execution used by the dynamic accelerated data structure generator are each executed by separate hardware threads disposed on at least one of the plurality of processing elements.

23. The method of claim 22, wherein the interconnected set of hardware-based processing elements comprises a plurality of nodes interconnected to one another in a Network On Chip (NOC) arrangement.

24. The method of claim 16, wherein the accelerated data structure comprises a base b branch tree split up into a plurality of branches of depth k, the method further comprising in the dynamic accelerated data structure generator dynamically expanding the branch tree whenever a primitive needs to be inserted into a full branch.

25. The method of claim 24, wherein the dynamic accelerated data structure generator is configured to dynamically build an accelerated data structure from the stream of primitives by executing an instance of a placement routine in each of the plurality of parallel threads of execution to insert a plurality of primitives into the branch tree in parallel.

* * * * *